(12) United States Patent
Yoon et al.

(10) Patent No.: US 11,773,236 B2
(45) Date of Patent: Oct. 3, 2023

(54) METHOD OF PREPARING SUPERABSORBENT POLYMER SHEET

(71) Applicant: LG Chem, Ltd., Seoul (KR)

(72) Inventors: Kiyoul Yoon, Daejeon (KR); Seongkyun Kang, Daejeon (KR); Gicheul Kim, Daejeon (KR); Hyeon Choi, Daejeon (KR); Ju Eun Kim, Daejeon (KR)

(73) Assignee: LG Chem, Ltd.

( * ) Notice: Subject to any disclaimer, the term of this patent is extended or adjusted under 35 U.S.C. 154(b) by 734 days.

(21) Appl. No.: 16/757,158

(22) PCT Filed: Sep. 10, 2019

(86) PCT No.: PCT/KR2019/011716
§ 371 (c)(1),
(2) Date: Apr. 17, 2020

(87) PCT Pub. No.: WO2020/067662
PCT Pub. Date: Apr. 2, 2020

(65) Prior Publication Data
US 2020/0239666 A1    Jul. 30, 2020

(30) Foreign Application Priority Data
Sep. 27, 2018  (KR) .......... 10-2018-0115311
Sep. 6, 2019   (KR) .......... 10-2019-0110999

(51) Int. Cl.
*C08K 5/56* (2006.01)
*C08K 5/01* (2006.01)
*C08F 120/06* (2006.01)

(52) U.S. Cl.
CPC .............. *C08K 5/56* (2013.01); *C08F 120/06* (2013.01); *C08K 5/01* (2013.01); *C08K 2201/003* (2013.01)

(58) Field of Classification Search
CPC ...... C08K 5/56; C08K 2201/003; C08K 5/01; C08F 120/06
See application file for complete search history.

(56) References Cited

U.S. PATENT DOCUMENTS

| | | | |
|---|---|---|---|
| 6,100,305 A | 8/2000 | Miyake et al. | |
| 7,163,966 B2 | 1/2007 | Joy et al. | |
| 7,615,579 B2 | 11/2009 | Joy et al. | |
| 9,737,874 B2 | 8/2017 | Wattebled et al. | |
| 10,065,175 B2 * | 9/2018 | Lee | B01J 20/3064 |
| 10,391,195 B2 | 8/2019 | Henn et al. | |
| 11,020,725 B2 * | 6/2021 | Kim | B01J 20/3293 |
| 2003/0134102 A1 | 7/2003 | Wang et al. | |
| 2005/0137546 A1 | 6/2005 | Joy et al. | |
| 2009/0191408 A1 | 7/2009 | Tian et al. | |
| 2009/0192482 A1 | 7/2009 | Dodge, II et al. | |
| 2012/0001122 A1 * | 1/2012 | Wattebled | C08F 2/44 252/194 |
| 2013/0096000 A1 | 4/2013 | Tian et al. | |
| 2013/0274349 A1 | 10/2013 | Qin et al. | |
| 2014/0054497 A1 | 2/2014 | Wattebled et al. | |
| 2014/0257223 A1 | 9/2014 | Henn et al. | |
| 2015/0283284 A1 | 10/2015 | Azad et al. | |
| 2016/0354757 A1 | 12/2016 | Lee et al. | |
| 2018/0178193 A1 | 6/2018 | Lee et al. | |
| 2018/0228671 A1 | 8/2018 | Hwang et al. | |
| 2018/0237594 A1 | 8/2018 | Lee et al. | |
| 2019/0248963 A1 | 8/2019 | Yoon et al. | |
| 2021/0023529 A1 * | 1/2021 | Lee | C08L 25/02 |

FOREIGN PATENT DOCUMENTS

| | | | | |
|---|---|---|---|---|
| CN | 102361653 A | 2/2012 | | |
| CN | 104220501 A | 12/2014 | | |
| CN | 105980464 A | 9/2016 | | |
| CN | 106750475 A | 5/2017 | | |
| CN | 107722329 A | 2/2018 | | |
| CN | 107822779 A | 3/2018 | | |
| CN | 107922534 A | 4/2018 | | |
| CN | 107922637 A | 4/2018 | | |
| DE | 102011007723 A1 | 10/2012 | | |
| EP | 2167552 A1 | 3/2010 | | |
| EP | 2930191 A1 | 10/2015 | | |
| EP | 3241861 A1 | 11/2017 | | |
| EP | 3318596 A1 | 5/2018 | | |
| EP | 3750953 A1 * | 12/2020 | ............ | B01J 20/261 |
| JP | H10119042 A | 5/1998 | | |
| JP | 2007314794 A | 12/2007 | | |
| JP | 5336704 B2 | 11/2013 | | |
| JP | 2018030308 A | 3/2018 | | |
| KR | 20040070245 A | 8/2004 | | |

(Continued)

OTHER PUBLICATIONS

Search Report dated Feb. 21, 2022 from the Office Action for Chinese Application No. 201980004789.9 dated Mar. 4, 2022, 3 pages. [See p. 2, categorizing the cited references].
International Search Report for Application No. PCT/KR2019/011716 dated Apr. 2, 2020, 3 pages.
Odian, George, Principle of Polymerization, 2nd edition, 1981, John Wiley & Sons, p. 203, 3 pages.
Schwalm, Reinhold, UV Coatings: Basics, Recent Developments and New Applications, Dec. 21, 2006, Elsevier Science, p. 115, 3 pages.

(Continued)

*Primary Examiner* — Robert D Harlan
(74) *Attorney, Agent, or Firm* — Lerner David LLP (57) ABSTRACT

Provided is a method of preparing a superabsorbent polymer sheet, including polymerization of monomers in the presence of an encapsulated foaming agent and an inorganic foaming agent. According to the method of preparing the superabsorbent polymer sheet of the present invention, a porous flexible superabsorbent polymer sheet may be prepared.

16 Claims, 1 Drawing Sheet

(56) References Cited

FOREIGN PATENT DOCUMENTS

| | | | |
|---|---|---|---|
| KR | 20100130590 | A | 12/2010 |
| KR | 20120043165 | A | 5/2012 |
| KR | 20140026506 | A | 3/2014 |
| KR | 101635257 | B1 | 6/2016 |
| KR | 20160063956 | A | 6/2016 |
| KR | 101650261 | B1 | 8/2016 |
| KR | 20180071940 | A | 6/2018 |
| WO | 2005095498 | A1 | 10/2005 |
| WO | 2017042707 | A2 | 3/2017 |
| WO | 2018037816 | A1 | 3/2018 |

OTHER PUBLICATIONS

European Search Report for Application No. EP19867682, dated Oct. 13, 2020, 10 pages.

\* cited by examiner

Comparative Example 2          Example 1

METHOD OF PREPARING SUPERABSORBENT POLYMER SHEET

CROSS-REFERENCE TO RELATED APPLICATIONS

The present application is a national phase entry under 35 U.S.C. § 371 of International Application No. PCT/KR2019/011716, filed on Sep. 10, 2019 which claims priority from, Korean Patent Application Nos. 10-2018-0115311, filed on Sep. 27, 2018 and Korean Patent Application No. 10-2019-0110999, filed on Sep. 6, 2019, the disclosures of which are hereby incorporated by reference in their entirety.

TECHNICAL FIELD

The present invention relates to a method of preparing a superabsorbent polymer sheet.

BACKGROUND ART

A superabsorbent polymer (SAP) is a synthetic polymeric material capable of absorbing moisture from 500 to 1000 times its own weight. Various manufacturers have denominated it as different names, such as SAM (Super Absorbency Material), AGM (Absorbent Gel Material), etc. Since such superabsorbent polymers started to be practically applied in sanitary products, now they have been widely used not only for hygiene products such as disposable diapers for children, sanitary pads, etc., but also for water retaining soil products for gardening, water stop materials for the civil engineering and construction, sheets for raising seedling, fresh-keeping agents for food distribution fields, materials for poultice or the like.

Generally, various hygiene products such as diapers, sanitary pads, incontinence pads, etc. include an absorbent including superabsorbent polymer particles. Such an absorbent mainly includes the superabsorbent polymer particles and fluff pulp which is used to properly fix the superabsorbent polymer particles while maintaining the shape of the absorbent and hygiene products.

However, due to the presence of the fluff pulp, it has been difficult to make the absorbent and hygiene products slim and thin, and there has been a problem in that a user feels less comfortable, because the user's skin in contact with the hygiene product gets sweaty. Moreover, since a large quantity of fluff pulp which is mainly obtained from a wood raw material is needed, there has been a backlash against recent trends of environmental protection, and it has become one of the main causes for increasing production costs of the absorbent layer and hygiene products.

For this reason, many attempts have been made to reduce the use of fluff pulp in the absorbent layer and hygiene products or to provide hygiene products without fluff pulp, so-called pulpless diapers, etc.

Meanwhile, current superabsorbent polymers are mostly prepared and used in the form of powder. Such superabsorbent polymers in the form of powder may scatter or leak during preparation of sanitary materials or in actual use thereof, and they have a limited range of use because the superabsorbent polymers are needed to be used together with a specific type of substrate.

Accordingly, a method of preparing a superabsorbent polymer in the form of a fiber or a non-woven fabric has been suggested. However, there is no satisfactory method of obtaining a superabsorbent polymer which may have no reduction in absorption performances, may be used as a pulpless absorbent, and may exhibit sufficient flexibility, and therefore, there is still a need to study a preparation method thereof.

DISCLOSURE

Technical Problem

To solve the above problems, the present invention provides a method of preparing a superabsorbent polymer sheet exhibiting high pliability, a high absorption rate, and excellent texture.

Technical Solution

To solve the above problems, the present invention provides a method of preparing a superabsorbent polymer sheet, the method including the steps of:

preparing a monomer composition by mixing an acrylic acid-based monomer having acidic groups, of which at least a part is neutralized, an internal crosslinking agent including polyol, an encapsulated foaming agent, an inorganic foaming agent, and a polymerization initiator;

forming a water-containing gel polymer by performing thermal polymerization or photopolymerization of the monomer composition; and drying the water-containing gel polymer.

The polyol may include one or more selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, and glycerol.

The polyol may be included in an amount of 10 parts by weight to 80 parts by weight with respect to 100 parts by weight of the acrylic acid-based monomer.

The encapsulated foaming agent may have a mean diameter of 2 μm to 50 μm.

The encapsulated foaming agent may have an expansion ratio of 3 times to 15 times in air.

The encapsulated foaming agent may have a structure including a core which contains hydrocarbon and a shell which surrounds the core and is formed using a thermoplastic resin.

In this regard, the hydrocarbon may be one or more selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane, and cyclooctane, and the thermoplastic resin may be a polymer formed from one or more monomers selected from the group consisting of (meth)acrylate, (meth)acrylonitrile, aromatic vinyl, vinyl acetate, vinyl halide, and vinylidene halide.

The inorganic foaming agent may be one or more selected from calcium carbonate ($CaCO_3$), sodium bicarbonate ($NaHCO_3$), ammonium bicarbonate ($NH_4HCO_3$), ammonium carbonate ($(NH_4)_2CO_3$), ammonium nitrite ($NH_4NO_2$), sodium borohydride ($NaBH_4$), and sodium carbonate ($Na_2CO_3$).

The encapsulated foaming agent and the inorganic foaming agent may be included at a weight ratio of 3:1 to 1:1.

The encapsulated foaming agent may be included in an amount of 0.3 parts by weight to 20 parts by weight with respect to 100 parts by weight of the acrylic acid-based monomer.

The inorganic foaming agent may be included in an amount of 0.2 parts by weight to 10 parts by weight with respect to 100 parts by weight of the acrylic acid-based monomer.

According to another aspect of the present invention, provided is a superabsorbent polymer sheet including a crosslinked polymer which is prepared by crosslinking polymerization of an acrylic acid-based monomer having acidic groups, of which at least a part is neutralized, in the presence of an internal crosslinking agent including polyol, an encapsulated foaming agent, and an inorganic foaming agent.

The superabsorbent polymer sheet may have centrifuge retention capacity (CRC) of 10 g/g to 40 g/g, as measured in accordance with EDANA method WSP 241.2.

The superabsorbent polymer sheet may have absorbency under pressure (AUP) of 0.7 psi of 5 g/g to 20 g/g, as measured in accordance with EDANA method WSP 242.2.

The superabsorbent polymer sheet may have an expansion ratio of 200% or more, the expansion ratio defined by the area of width*length of the superabsorbent polymer sheet which is cut to a size of width*length*thickness=50 mm*50 mm*2 mm and the area of width*length of the superabsorbent polymer sheet after being dried at a temperature of 180° C. for 5 minutes.

Effect of the Invention

A superabsorbent polymer sheet obtained by the preparation method of the present invention may be obtained in the form of sheet or film, unlike a common superabsorbent polymer in the form of powder, may be directly applied as a product, may have no risk of scattering or leaking, and may exhibit excellent texture and flexibility.

Further, the superabsorbent polymer sheet obtained by the method of preparing the superabsorbent polymer sheet of the present invention may have an open pore channel structure in which pores are connected to each other, whereby water absorption by a capillary pressure may occur to improve an absorption rate and permeability.

As described, the superabsorbent polymer may exhibit a high absorption rate as its intrinsic property while having flexibility and pliability, and thus it may be applied to a variety of products which are required to have pliability and high absorbency.

Further, the superabsorbent polymer sheet may be used as a pulpless absorbent.

BEST MODE FOR CARRYING OUT THE INVENTION

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Hereinafter, a method of preparing a superabsorbent polymer sheet according to one embodiment of the present invention will be described.

According to one embodiment of the present invention, provided is a method of preparing a superabsorbent polymer sheet, the method including the steps of:

preparing a monomer composition by mixing an acrylic acid-based monomer having acidic groups, of which at least a part is neutralized, an internal crosslinking agent including polyol, an encapsulated foaming agent, an inorganic foaming agent, and a polymerization initiator; forming a water-containing gel polymer by performing thermal polymerization or photopolymerization of the monomer composition; and drying the water-containing gel polymer.

In the preparation method of the present invention, the monomer composition which is a raw material of the superabsorbent polymer may include the acrylic acid-based monomer having acidic groups, of which at least a part is neutralized, the internal crosslinking agent including polyol, the encapsulated foaming agent, the inorganic foaming agent, and the polymerization initiator.

First, the acrylic acid-based monomer is a compound represented by the following Chemical Formula 1:

$$R^1-COOM^1 \quad \text{Chemical Formula 1}$$

in Chemical Formula 1, $R^1$ is an alkyl group containing an unsaturated bond and having 2 to 5 carbon atoms, and $M^1$ is a hydrogen atom, a monovalent or divalent metal, an ammonium group, or an organic amine salt.

Preferably, the acrylic acid-based monomer may include one or more selected from the group consisting of acrylic acid, methacrylic acid, and a monovalent metal salt thereof, a divalent metal salt thereof, an ammonium salt thereof, and an organic amine salt thereof.

Here, the acrylic acid-based monomer may have acidic groups, of which at least a part is neutralized. Preferably, those partially neutralized with an alkali substance such as sodium hydroxide, potassium hydroxide, ammonium hydroxide, etc. may be used as the monomer. In this regard, a degree of neutralization of the acrylic acid-based monomer may be 40 mol % to 95 mol %, or 40 mol % to 80 mol %, or 45 mol % to 75 mol %. The range of the neutralization degree may vary depending on final physical properties. However, an excessively high degree of neutralization renders the neutralized monomers precipitated, and thus polymerization may not occur readily, whereas an excessively low degree of neutralization not only greatly deteriorates absorbency of the polymer but also endows the polymer with hard-to-handle properties, such as of elastic rubber.

A concentration of the acrylic acid-based monomer may be about 20% by weight to about 60% by weight, preferably about 40% by weight to about 50% by weight, with respect to the monomer composition including the raw materials of the superabsorbent polymer and a solvent, and the concentration may be properly controlled, taking into consideration a polymerization time and reaction conditions. However, if the monomer concentration is too low, the yield of the superabsorbent polymer may become low and an economic problem may occur. On the contrary, if the concentration is too high, there is a process problem that a part of the monomers is precipitated, or pulverization efficiency is lowered upon pulverization of the polymerized water-containing gel polymer, and the physical properties of the superabsorbent polymer may be reduced.

The monomer composition of the present invention includes polyol as the internal crosslinking agent.

The polyol forms a polymeric structure having flexibility by crosslinking reaction with the acrylic acid-based monomer, and may also contribute to increasing a water content of the superabsorbent polymer sheet due to its hygroscopicity.

Examples of the applicable polyol may include ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, or glycerol, and preferably glycerol.

The polyol may be used in an amount of 10 to 80 parts by weight, preferably 20 parts by weight to 50 parts by weight, more preferably 30 parts by weight to 40 parts by weight with respect to 100 parts by weight of the acrylic acid-based monomer. If the content of the polyol is too small, there may be no effect of increasing the water content. If the content of the polyol is too large, the absorption rate and the absorbency may be reduced. In this respect, the polyol may be preferably used in the above range of content.

The monomer composition of the present invention may further include another internal crosslinking agent in addition to the polyol. In this regard, the internal crosslinking agent may be poly(meth)acrylate-based compounds of polyol, e.g., poly(meth)acrylate-based compounds of polyol having 2 to 10 carbon atoms. More specific examples thereof may include trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, or pentaerythritol tetraacrylate, preferably, polyethylene glycol diacrylate.

The internal crosslinking agent may be included at a concentration of about 0.01% by weight to about 2% by weight, or 0.1% by weight to 0.5% by weight with respect to the monomer composition, thereby crosslinking the polymerized polymer.

The monomer composition of the present invention includes the foaming agent, and in this regard, it includes the encapsulated foaming agent and the inorganic foaming agent at the same time. When such two kinds of foaming agents are used in a mixture, there is an effect of obtaining high porosity and open pores of the superabsorbent polymer sheet. In other words, when the encapsulated foaming agent and the inorganic foaming agent are used at the same time as in the present invention, main pores having a size suitable for securing high porosity inside the superabsorbent polymer sheet are generated by the encapsulated foaming agent, and a micropore channel is formed between the main pores by the inorganic foaming agent to secure an open pore channel structure in which main pores are connected to each other. Therefore, due to the micropore channel structure, rapid absorption of water by a capillary pressure may occur, and the superabsorbent polymer sheet to be prepared may exhibit excellent centrifuge retention capacity and absorbency under pressure, as compared with those prepared by using each of the foaming agents alone. Moreover, due to the structure, flexibility of the superabsorbent polymer sheet may be greatly increased.

The encapsulated foaming agent may exist in an encapsulated state during polymerization of the monomer composition and may expand by heat, and may be foamed by high-temperature heat which is applied during a drying process described below. As a result, pores having a proper size are generated between polymer structures of the superabsorbent polymer, and thus the superabsorbent polymer sheet may exhibit the open pore channel structure.

The encapsulated foaming agent may have a structure including a core which contains hydrocarbon and a shell which surrounds the core and is formed using a thermoplastic resin. Such an encapsulated foaming agent may have expansion properties which may vary depending on components constituting the core and the shell, weights of the respective components, particle sizes thereof. By adjusting these factors, it is possible to expand pores to a desired size and to control porosity of the superabsorbent polymer sheet.

Meanwhile, in order to examine whether pores with a desired size are generated, it is necessary to examine expansion properties of the encapsulated foaming agent. However, the foamed shape of the encapsulated foaming agent inside the superabsorbent polymer is difficult to define as one shape, because it may vary depending on the preparation conditions of the superabsorbent polymer. Therefore, the encapsulated foaming agent is first foamed in air, and then its expansion ratio and size are examined, thereby determining whether it is suitable for forming desired pores.

In detail, the encapsulated foaming agent is applied on a glass petri dish, which is then heated in air at 180° C. for 5 minutes to expand the encapsulated foaming agent. In this regard, when the encapsulated foaming agent exhibits a maximum expansion ratio of 3 times to 15 times, 5 times to 15 times, or 8.5 times to 10 times in air, it may be determined as being suitable for forming an appropriate open pore structure in the method of preparing the superabsorbent polymer sheet of the present invention.

The encapsulated foaming agent may have a mean diameter of 2 μm to 50 μm, or 5 μm to 30 μm, or 5 μm to 20 μm, or 7 μm to 17 μm. When the encapsulated foaming agent exhibits the above mean diameter, it may be determined as being suitable for achieving an appropriate porosity.

Further, when the encapsulated foaming agent exhibits a maximum expansion diameter of 20 μm to 190 μm, or 50 μm to 190 μm, or 70 μm to 190 μm, or μm 75 to 190 μm in air, it may be determined as being suitable for forming an appropriate open pore structure in the method of preparing the superabsorbent polymer sheet of the present invention.

Further, the maximum expansion ratio and the maximum expansion diameter of the encapsulated foaming agent may be measured by analyzing the shapes of pores generated in the prepared superabsorbent polymer sheet using scanning electron microscopy (SEM).

The hydrocarbon constituting the core of the encapsulated foaming agent may be one or more selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane, and cyclooctane. Among them, hydrocarbons having 3 to 5 carbon atoms (n-propane, n-butane, iso-butane, cyclobutane, n-pentane, iso-pentane, cyclopentane) may be suitable for forming the pores having the above-described size, and iso-butane may be the most suitable.

The thermoplastic resin constituting the shell of the encapsulated foaming agent may be a polymer formed from one or more monomers selected from the group consisting of (meth)acrylate, (meth)acrylonitrile, aromatic vinyl, vinyl acetate, vinyl halide, and vinylidene halide. Among them, a copolymer of (meth)acrylate and (meth)acrylonitrile may be the most suitable for forming the pores having the above-described size.

The encapsulated foaming agent may include the hydrocarbon in an amount of 10% by weight to 30% by weight with respect to the total weight of the encapsulated foaming agent. This range may be the most suitable for forming the open pore structure.

A directly prepared encapsulated foaming agent may be used, or a commercially available foaming agent satisfying the above-described conditions may be used.

Further, the encapsulated foaming agent may be used in an amount of 0.3 parts by weight to 20 parts by weight, preferably 0.5 parts by weight to 10 parts by weight, and more preferably 1 part by weight to 10 parts by weight with respect to 100 parts by weight of the acrylic acid-based monomer. If the content of the encapsulated foaming agent is too low, there are problems in that the open pore structure may not be properly formed, and appropriate porosity may not be secured. On the contrary, if the content of the encapsulated foaming agent is too high, porosity may be too high, and as a result, strength of the superabsorbent polymer may be weakened. In this respect, the encapsulated foaming agent may be preferably used in the above range of content.

The inorganic foaming agent may have a diameter of preferably 10 nm to 1000 nm, and more preferably 20 nm to 500 nm, or 50 nm to 100 nm. The inorganic foaming agent of the above range may form a micropore channel and may serve to collapse the boundary between pores generated by the encapsulated foaming agent, thereby greatly improving absorbency of the superabsorbent polymer sheet. The diameter of the inorganic foaming agent may be measured by scanning electron microscopy (SEM).

As the inorganic foaming agent, any foaming agent commonly known may be used without limitation. Specifically, one or more selected from the group consisting of calcium carbonate ($CaCO_3$), sodium bicarbonate ($NaHCO_3$), ammonium bicarbonate ($NH_4HCO_3$), ammonium carbonate (($NH_4)_2CO_3$), ammonium nitrite ($NH_4NO_2$), sodium borohydride ($NaBH_4$), and sodium carbonate ($Na_2CO_3$) may be used. Among them, calcium carbonate may be preferably used, taking into consideration stability in a neutralized solution.

The inorganic foaming agent may be used in an amount of 0.1 part by weight or more, preferably 0.2 parts by weight to 10 parts by weight, and more preferably 0.3 parts by weight to 5 parts by weight with respect to 100 parts by weight of the acrylic acid-based monomer. If the content of the inorganic foaming agent is too low, there is a problem in that closed pores may be generated. If the content of the inorganic foaming agent is too high, there is a problem in that mechanical strength may be reduced due to high porosity.

A mixing ratio of the encapsulated foaming agent and the inorganic foaming agent may be preferably a weight ratio of 3:1 to 1:1, and more preferably, a weight ratio of 2:1 to 1:1. In the above range, the effects of improving high porosity and mechanical strength may be obtained, thereby improving centrifuge retention capacity and absorbency under pressure of the superabsorbent polymer sheet to be prepared.

Further, the encapsulated foaming agent and the inorganic foaming agent may be included in an amount of 20 parts by weight or less, and more preferably, 0.4 parts by weight to 20 parts by weight, 0.7 parts by weight to 10 parts by weight, or 1 part by weight to 5 parts by weight with respect to 100 parts by weight of the acrylic acid monomer. If the total amount of the foaming agents is too large, the degree of foaming is too high, and thus the strength of the superabsorbent polymer may be reduced. If the total amount of the foaming agents is too small, the open pore structure is hardly formed. Therefore, it is preferable that the total amount thereof satisfies the above range.

In the method of preparing the superabsorbent polymer sheet of the present invention, the polymerization initiator used during polymerization is not particularly limited, as long as it is generally used in the preparation of the superabsorbent polymer.

Specifically, the polymerization initiator may be a thermal polymerization initiator or a photo-polymerization initiator by UV irradiation, depending on a polymerization method. However, even though the photopolymerization is performed, a certain amount of heat may be generated by UV irradiation or the like, and also generated with exothermic polymerization reaction. Therefore, the thermal polymerization initiator may be further included.

As the photo-polymerization initiator, a compound capable of forming radicals by a light such as UV may be used without limitations in the constitution.

For example, one or more selected from the group consisting of benzoin ether, dialkyl acetophenone, hydroxyl alkylketone, phenyl glyoxylate, benzyl dimethyl ketal, acyl phosphine, and α-aminoketone may be used as the photo-polymerization initiator. Meanwhile, as the specific example of acyl phosphine, commercially available lucirin TPO, namely, 2,4,6-trimethyl-benzoyl-trimethyl phosphine oxide may be used. More various photo-polymerization initiators are well disclosed in "UV Coatings: Basics, Recent Developments and New Application (Elsevier 2007)" written by Reinhold Schwalm, p 115, however, they are not limited to the above described examples.

The photo-polymerization initiator may be included in an amount of about 0.01% by weight to about 1.0% by weight in the monomer composition. If the concentration of the photo-polymerization initiator is too low, the polymerization rate may become low. If the concentration of the photo-polymerization initiator is too high, the molecular weight of the superabsorbent polymer may become low and its physical properties may not be uniform.

Further, one or more selected from the group consisting of persulfate-based initiators, azo-based initiators, hydrogen peroxide, and ascorbic acid may be used as the thermal polymerization initiator. Specific examples of the persulfate-based initiators may include sodium persulfate ($Na_2S_2O_8$), potassium persulfate ($K_2S_2O_8$), ammonium persulfate (($NH_4)_2S_2O_8$) or the like. Examples of the azo-based initiators may include 2,2-azobis(2-amidinopropane)dihydrochloride, 2,2-azobis-(N,N-dimethylene)isobutyramidine dihydrochloride, 2-(carbamoylazo)isobutyronitrile, 2,2-azobis(2-[2-imidazolin-2-yl]propane)dihydrochloride, 4,4-azobis-(4-cyanovaleric acid) or the like. More various thermal polymerization initiators are well-disclosed in 'Principle of Polymerization (Wiley, 1981)' written by Odian, p 203, however, they are not limited to the above described examples.

The thermal polymerization initiator may be included in an amount of about 0.001% by weight to about 0.5% by weight in the monomer composition. If the concentration of the thermal polymerization initiator is too low, additional thermal polymerization hardly occurs, and thus the sufficient addition effect of the thermal polymerization initiator may not be obtained. If the concentration of the thermal polymerization initiator is too high, the molecular weight of the superabsorbent polymer may become low and its physical properties may not be uniform.

In the preparation method of the present invention, the monomer composition may further include an additive such as a thickener, a plasticizer, a preservation stabilizer, an antioxidant, etc., if necessary.

The raw materials such as the above-described acrylic acid-based unsaturated monomer, comonomer, internal crosslinking agent, polymerization initiator, and additive may be prepared in the form of a solution in which the monomer composition is dissolved in a solvent. The solvent may be included in a residual amount excluding the above-described components from the total weight of the monomer composition.

As the solvent to be applicable, any solvent may be used without limitations in the constitution as long as it is able to dissolve the above components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide may be used in combination.

Next, the water-containing gel polymer may be formed by thermal polymerization or photo-polymerization of the monomer composition.

Meanwhile, the method of forming the water-containing gel polymer by thermal polymerization or photo-polymerization of the monomer composition is not particularly limited in the constitution, as long as it is a polymerization method generally used in the art related to the preparation of the superabsorbent polymer.

Specifically, the polymerization method is largely classified into the thermal polymerization and the photo-polymerization according to a polymerization energy source. The thermal polymerization may be commonly carried out in a reactor like a kneader equipped with agitating spindles whereas the photo-polymerization may be carried out in a reactor equipped with a movable conveyor belt. The above-described polymerization method is an example only, and the present invention is not limited to the above-described polymerization methods.

A reaction temperature of the thermal polymerization or photopolymerization of the monomer composition is not particularly limited, but the reaction temperature may be, for example, 80° C. to 120° C., preferably 90° C. to 110° C.

In this regard, the water-containing gel polymer thus obtained by the method may have generally a water content of about 40% by weight to about 80% by weight. Meanwhile, the "water content" of the water-containing gel polymer means a weight occupied by water with respect to the total weight of the water-containing gel polymer, which may be a value obtained by subtracting the weight of the dried polymer from the weight of the water-containing gel polymer. Specifically, the water content is defined as a value calculated by measuring the weight loss according to evaporation of water in the polymer during the drying process of increasing the temperature of the polymer with infrared heating. In this regard, the water content is measured under the drying conditions which are determined as follows; the temperature is increased from room temperature to about 180° C. and then the temperature is maintained at 180° C., and the total drying time is determined as 20 minutes, including 5 minutes for the temperature rising step.

Next, the water-containing gel polymer is molded in the form of a sheet, and dried to form the superabsorbent polymer sheet. In the drying step, foaming may occur due to the foaming agents, and as a result, the micropore channel may be formed between main pores in the superabsorbent polymer sheet, and the open pore channel structure may be formed.

In this regard, the drying temperature of the drying step may be about 120° C. to about 250° C. When the drying temperature is lower than 120° C., there is a concern about excessively extended drying time or deterioration of the physical properties of the superabsorbent polymer finally formed, and when the drying temperature is higher than 250° C., only the surface of the polymer is dried, and thus there is a concern about deterioration of the physical properties of the superabsorbent polymer finally formed. Therefore, the drying may be preferably performed at a temperature of about 120° C. to about 250° C., and more preferably about 140° C. to about 200° C.

Meanwhile, the drying may be carried out for about 20 minutes to about 90 minutes, taking into consideration the process efficiency, but is not limited thereto.

Any drying method may be selected and used in the drying step without limitation in the constitution, as long as it is commonly used in the drying process of the water-containing gel polymer. Specifically, the drying step may be carried out by a method of supplying hot air, irradiating infrared rays, irradiating microwaves, irradiating ultraviolet rays, or the like.

Meanwhile, to achieve the appropriate water content of the superabsorbent polymer sheet after the drying step, a process of exposing the dried superabsorbent polymer sheet to high-temperature steam of 80° C. to 100° C. may be further performed.

When the drying step as above is finished, the water content of the superabsorbent polymer sheet may be about 10% by weight or more, for example, about 10% by weight to about 40% by weight, or about 15% by weight to about 30% by weight. When the water content of the superabsorbent polymer sheet is within the above range, it is possible to secure flexibility of the sheet. A method of measuring the water content of the superabsorbent polymer sheet may be more specified in Examples below.

According to one embodiment of the present invention, the superabsorbent polymer sheet obtained by the above processes may have a thickness of about 100 μm or more, or 1,000 μm, or 5,000 μm and about 10 cm or less, or about 5 cm or less, or about 1 cm or less. If the thickness of the superabsorbent polymer sheet is too thin, the sheet may be torn due to its low strength. If the thickness of the superabsorbent polymer sheet is too thick, drying and processing may be difficult. From this point of view, the superabsorbent polymer sheet may preferably have a thickness within the above range.

The superabsorbent polymer sheet prepared according to the above preparation method may be in the form of a sheet in which at least part of the pores may be connected to each other to form the open pore channel structure, and therefore, water absorption by a capillary pressure may occur. Accordingly, the superabsorbent polymer sheet may have more improved absorption rate and permeability, as compared with existing superabsorbent polymers in the form of powder, and the superabsorbent polymer sheet itself may be used as a pulpless absorbent.

According to one embodiment of the present invention, provided is the superabsorbent polymer sheet obtained by the above preparation method.

The superabsorbent polymer sheet includes a crosslinked polymer which is prepared by crosslinking polymerization of the acrylic acid-based monomer having acidic groups, of which at least a part is neutralized, in the presence of the internal crosslinking agent including polyol, the encapsulated foaming agent, and the inorganic foaming agent.

The superabsorbent polymer sheet may have the open pore channel structure in which at least part of pores are connected to each other, whereby water absorption by a capillary pressure may occur.

The superabsorbent polymer sheet may have centrifuge retention capacity (CRC) of 10 g/g or more, 15 g/g or more, or 20 g/g or more, and 40 g/g or less, 30 g/g or less, or 25 g/g or less, as measured in accordance with EDANA method WSP 241.2.

The superabsorbent polymer sheet may have absorbency under pressure (AUP) (0.7 psi) of 5 g/g or more, 7 g/g or more, or 9 g/g or more, and 20 g/g or less, or 15 g/g or less, as measured in accordance with EDANA method WSP 242.2.

The superabsorbent polymer sheet may have a high expansion ratio of 200% or more, 250% or more, or 300% or more, and 600% or less, 550% or less, or 500% or less, wherein the expansion ratio is measured by comparing areas before and after drying. Therefore, the superabsorbent polymer sheet may exhibit excellent pliability. The expansion ratio may be measured as follows: the water-containing gel polymer is cut in a sheet form having a size of width*length*thickness=50 mm*50 mm*2 mm using a cutting machine to obtain a superabsorbent polymer sheet, which is then dried at a temperature of 180° C. for 5 minutes, and the area of width*length of the superabsorbent polymer sheet before drying is compared with the area of width*length of the superabsorbent polymer sheet after drying.

Hereinafter, the actions and effects of the present invention will be described in more detail with reference to the specific Examples of the present invention. However, these Examples are for illustrative purposes only, and the scope of the present invention is not intended to be limited thereby in all aspects.

EXAMPLE

Preparation of Superabsorbent Polymer Sheet

Example 1

30 g of acrylic acid, 38.9 g of caustic soda (NaOH, 30 wt % solution), and 6.2 g of water were mixed to prepare a neutralized solution (a solid content: 50% by weight) in which about 70 mol % of the acrylic acid was neutralized.

To the neutralized solution, 12 g of glycerol, 0.09 g of polyethylene glycol diacrylate (MW=330 manufacturer: Aldrich), 0.06 g of sodium persulfate, 0.3 g of an encapsulated foaming agent (Akzonobel, Expancel 031 DU 40, mean diameter: 10 μm to 16 μm), and 0.3 g of a calcium carbonate ($CaCO_3$) foaming agent (diameter: 50 nm to 100 nm) were added to prepare a monomer composition.

The monomer composition was subjected to high-shear mixing using a mechanical mixer at a speed of 500 rpm for about 10 minutes.

Thereafter, the monomer composition was introduced into a polymerization reactor though a feed section, and polymerization was allowed to prepare a water-containing gel polymer. At this time, the polymerization reactor was maintained at a temperature of 100° C., and a maximum temperature of the polymerization was 110° C. and a polymerization time was 10 minutes.

Subsequently, the water-containing gel polymer was cut using a cutting machine in the form of a sheet (width*length*thickness=50 mm*50 mm*2 mm), and dried at a temperature of 180° C. for 5 minutes to prepare a superabsorbent polymer sheet. Thereafter, the prepared superabsorbent polymer sheet was exposed to high-temperature steam (80° C., 85%) for 10 minutes to prepare the superabsorbent polymer sheet having an increased water content.

Example 2

A superabsorbent polymer sheet was prepared in the same manner as in Example 1, except that the encapsulated foaming agent and the calcium carbonate foaming agent were used in an amount of 1.5% by weight, respectively, with respect to 100% by weight of acrylic acid in Example 1.

Comparative Example 1

A superabsorbent polymer sheet was prepared in the same manner as in Example 2, except that no encapsulated foaming agent and no inorganic foaming agent were used in Example 2.

Comparative Example 2

A superabsorbent polymer sheet was prepared in the same manner as in Example 2, except that no inorganic foaming agent was used in Example 2.

Comparative Example 3

A superabsorbent polymer sheet was prepared in the same manner as in Example 2, except that no encapsulated foaming agent was used in Example 2.

Comparative Example 4

A superabsorbent polymer sheet was prepared in the same manner as in Example 2, except that 12.09 g of polyethylene glycol diacrylate was used alone as the internal crosslinking agent, instead of glycerol and polyethylene glycol diacrylate, in Example 2.

EXPERIMENTAL EXAMPLE

Figure 1:
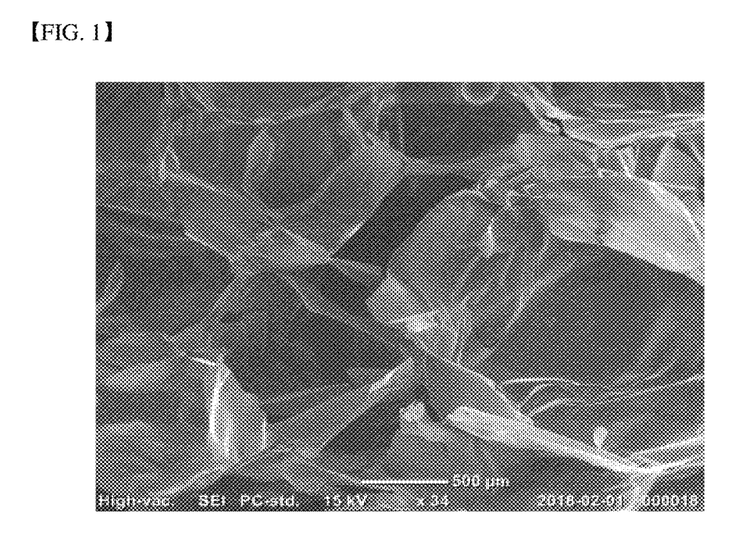
FIG. 1 is an image of scanning electron microscopy (SEM) showing a cross section of a superabsorbent polymer sheet prepared according to one embodiment of the present invention.

Experimental Example 1: Characterization of Superabsorbent Polymer Sheet (1) Cross Section of Superabsorbent Polymer Sheet An image of scanning electron microscopy (SEM) showing a cross section of the superabsorbent polymer sheet prepared according to Example 1 of the present invention is shown in FIG. 1. Referring to FIG. 1, it was observed that an open pore channel structure was formed on the surface of the superabsorbent polymer sheet prepared according to Example 1 of the present invention However, no porous structure was observed in Comparative Example 1 including no foaming agent.

(2) Flexibility

The superabsorbent polymer sheet was folded in half and then unfolded, and it was evaluated as O when returning to the original sheet state, and it was evaluated as X when the folded portion was cracked or broken and thus did not return to the original sheet state.

Figure 2:
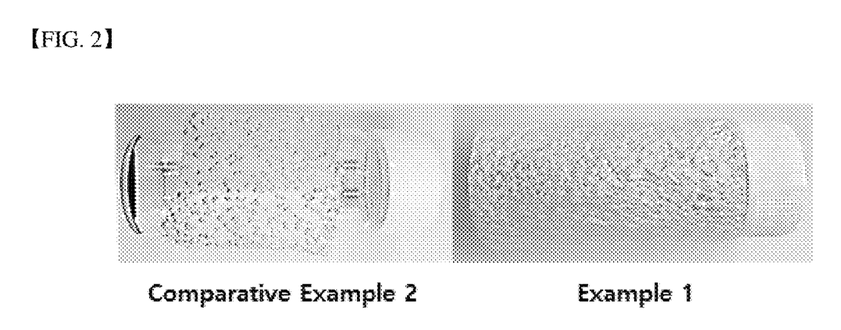
FIG. 2 is an image of testing flexibility of superabsorbent polymer sheets of Example 1 and Comparative Example 2.

Meanwhile, FIG. 2 shows the result of testing the degree of flexibility by winding each of the sheets of Example 1 and Comparative Example 2 into a vial having a diameter of 25 mm. Referring to FIG. 2, the sheet of Example 1 had excellent flexibility to tightly adhere around the curved surface of the vial, whereas the sheet of Comparative Example 2 had poor flexibility not to tightly adhere around the vial.

(3) Expansion Ratio

The expansion ratio was determined by comparing the area of width*length of the superabsorbent polymer sheet cut in a sheet form having a size of width*length*thickness=50 mm*50 mm*2 mm with the area of width*length of the superabsorbent polymer sheet prepared after drying at a temperature of 180° C. for 5 minutes.

(4) Water Content of Superabsorbent Polymer Sheet

Each 5 g of the superabsorbent polymer sheets prepared in Examples and Comparative Examples (of which cutting, drying, and steam exposure were completed) was heated and dried at 150° C. for 30 minutes, and water loss relative to its initial weight was calculated to determine the water content.

Experimental Example 2: Evaluation of Absorbency of Superabsorbent Polymer Sheet (1) Centrifuge Retention Capacity (CRC)

Centrifuge retention capacity (CRC) was measured in accordance with EDANA method WSP 241.2.

(2) Absorbency Under Pressure (AUP)

Absorbency under pressure (AUP) of 0.7 psi was measured in accordance with EDANA method WSP 242.2.

Characteristics of the superabsorbent polymer sheets prepared in Examples 1 to 2 and Comparative Examples 1 to 3 were evaluated and shown in Table 1 below.

TABLE 1

| | | Example 1 | Example 2 | Comparative Example 1 | Comparative Example 2 | Comparative Example 3 | Comparative Example 4 |
|---|---|---|---|---|---|---|---|
| Composition of monomer mixture * | Encapsulated foaming agent | 1.0 | 1.5 | — | 1.5 | — | 1.5 |
| | Inorganic foaming agent | 1.0 | 1.5 | — | — | 1.5 | 1.5 |
| | Glycerol | 30 | 30 | 30 | 30 | 30 | — |
| Properties of sheet | Porosity | ○ | ○ | X | ○ | ○ | X |
| | Flexibility | ○ | ○ | ○ | X | X | X |
| | Expansion ratio (%) | 350 | 430 | 100 | 130 | 120 | 300 |
| | Water content (%) | 17.2% | 16.3% | 17.9% | 16.6% | 18.2% | 17.1% |
| Absorption properties | CRC (g/g) | 21.7 | 20.7 | 15.2 | 17.2 | 16.4 | 5.6 |
| | AUP (g/g) | 9.6 | 9.2 | 7.1 | 9.1 | 6.1 | 5.5 |

* The composition of monomer mixture was expressed as parts by weight with respect to 100 parts by weight of acrylic acid.

Referring to Table 1, it was confirmed that the superabsorbent polymer sheets of Examples had excellent flexibility, porosity, and expansion ratio, as compared with the sheets of Comparative Examples having the similar water content, and therefore, they also had remarkably excellent absorption properties such as CRC, AUP, etc., as compared with those of Comparative Examples.

The invention claimed is:

1. A method of preparing a superabsorbent polymer sheet, comprising:
preparing a monomer composition by mixing an acrylic acid-based monomer having acidic groups, of which at least a part is neutralized, an internal crosslinking agent comprising a polyol, an encapsulated foaming agent, an inorganic foaming agent, and a polymerization initiator;
forming a water-containing gel polymer by performing thermal polymerization or photopolymerization of the monomer composition; and
drying the water-containing gel polymer.

2. The method of claim 1, wherein the polyol comprises one or more of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, or glycerol.

3. The method of claim 1, wherein the polyol is included in an amount of 10 parts by weight to 80 parts by weight with respect to 100 parts by weight of the acrylic acid-based monomer.

4. The method of claim 1, wherein the encapsulated foaming agent has a mean diameter of 2 μm to 50 μm.

5. The method of claim 1, wherein the encapsulated foaming agent has an expansion ratio of 3 times to 15 times in air.

6. The method of claim 1, wherein the encapsulated foaming agent has a structure including a core which contains hydrocarbon and a shell which surrounds the core and is formed using a thermoplastic resin.

7. The method of claim 6, wherein the hydrocarbon is one or more selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane, and cyclooctane.

8. The method of claim 6, wherein the thermoplastic resin is a polymer formed from one or more monomers selected from the group consisting of (meth)acrylate, (meth)acrylonitrile, aromatic vinyl, vinyl acetate, vinyl halide, and vinylidene halide.

9. The method of claim 1, wherein the inorganic foaming agent is one or more selected from calcium carbonate ($CaCO_3$), sodium bicarbonate ($NaHCO_3$), ammonium bicarbonate ($NH_4HCO_3$), ammonium carbonate ($(NH_4)_2CO_3$), ammonium nitrite ($NH_4NO_2$), sodium borohydride ($NaBH_4$), and sodium carbonate ($Na_2CO_3$).

10. The method of claim 1, wherein the encapsulated foaming agent and the inorganic foaming agent are included in a weight ratio of 3:1 to 1:1.

11. The method of claim 1, wherein the encapsulated foaming agent is included in an amount of 0.3 parts by weight to 20 parts by weight with respect to 100 parts by weight of the acrylic acid-based monomer.

12. The method of claim 1, wherein the inorganic foaming agent is included in an amount of 0.2 parts by weight to 10 parts by weight with respect to 100 parts by weight of the acrylic acid-based monomer.

13. A superabsorbent polymer sheet comprising a crosslinked polymer which is prepared by crosslinking polymerization of an acrylic acid-based monomer having acidic groups, of which at least a part is neutralized, in the presence of an internal crosslinking agent including polyol, an encapsulated foaming agent, and an inorganic foaming agent.

14. The superabsorbent polymer sheet of claim 13, wherein centrifuge retention capacity (CRC) is 10 g/g to 40 g/g, as measured in accordance with EDANA method WSP 241.2.

15. The superabsorbent polymer sheet of claim 13, wherein absorbency under pressure (AUP) of 0.7 psi is 5 g/g to 20 g/g, as measured in accordance with EDANA method WSP 242.2.

16. The superabsorbent polymer sheet of claim 13, wherein an expansion ratio is 200% or more, the expansion ratio defined by an area of width*length of the superabsorbent polymer sheet which is cut to a size of width*length*thickness=50 mm*50 mm*2 mm and an area of width*length of the superabsorbent polymer sheet after being dried at a temperature of 180° C. for 5 minutes.

\* \* \* \* \*